United States Patent [19]

Lerner et al.

[11] Patent Number: 5,530,911
[45] Date of Patent: Jun. 25, 1996

[54] METHOD AND APPARATUS FOR BATTERY DRAIN REDUCTION BY ADJUSTING FOR DYNAMIC CHANGES OF RECEIVER WARM-UP TIME

[75] Inventors: Kenneth S. Lerner, Boca Raton; Sarah J. Fain, Lake Worth; Robert M. Gorday, Boynton Beach, all of Fla.

[73] Assignee: Motorola, Inc., Schaumburg, Ill.

[21] Appl. No.: 276,133

[22] Filed: Jul. 15, 1994

[51] Int. Cl.⁶ .................................................. H04B 1/38
[52] U.S. Cl. .................. 455/38.3; 455/343; 340/825.44
[58] Field of Search ................................... 455/38.3, 343, 455/265, 260; 340/825.44; 370/95.1, 95.3

[56] References Cited

U.S. PATENT DOCUMENTS

| | | |
|---|---|---|
| 4,479,261 | 10/1984 | Oda et al. . |
| 4,673,892 | 6/1987 | Miyashita et al. . |
| 4,771,249 | 9/1988 | Burch et al. . |
| 5,128,632 | 7/1992 | Erhart et al. . |
| 5,140,698 | 8/1992 | Toko . |
| 5,152,006 | 9/1992 | Klaus ..................................... 455/38.3 |
| 5,265,270 | 11/1993 | Stengel et al. .......................... 455/343 |
| 5,376,975 | 12/1994 | Romero et al. ........................ 455/38.3 |

*Primary Examiner*—Andrew Faile
*Attorney, Agent, or Firm*—D. Andrew Floam

[57] ABSTRACT

A system and method for minimizing current drain of a battery in a portable receiver, such as a selective call receiver (110), by monitoring the warm-up time of a component (130) of the receiver (116), such as an oscillator (134), to periodically determine changes in the warm-up time of the component (130). That component of the receiver is powered up prior to designated time slots (440) by a time period (Wt) according to the dynamic changes in receiver warm-up time.

22 Claims, 9 Drawing Sheets

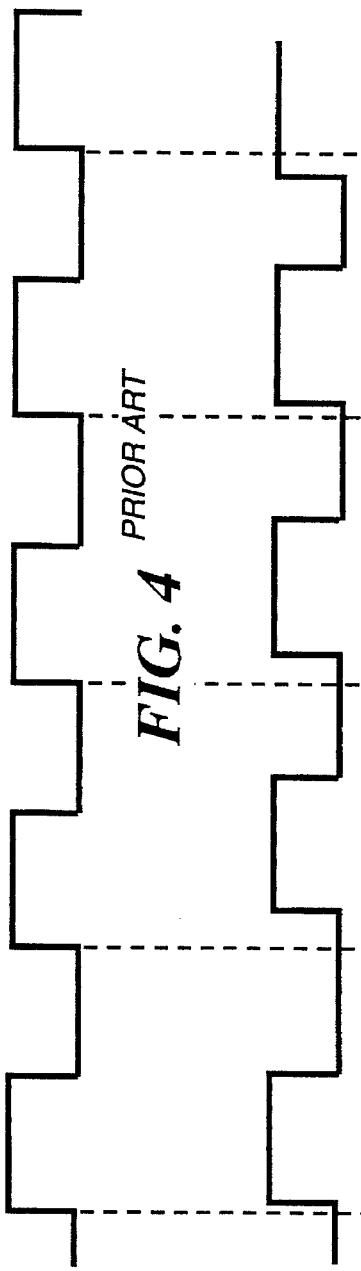
FIG. 4 *PRIOR ART*
FIG. 5 *PRIOR ART*
FIG. 6 *PRIOR ART*
FIG. 7 *PRIOR ART*

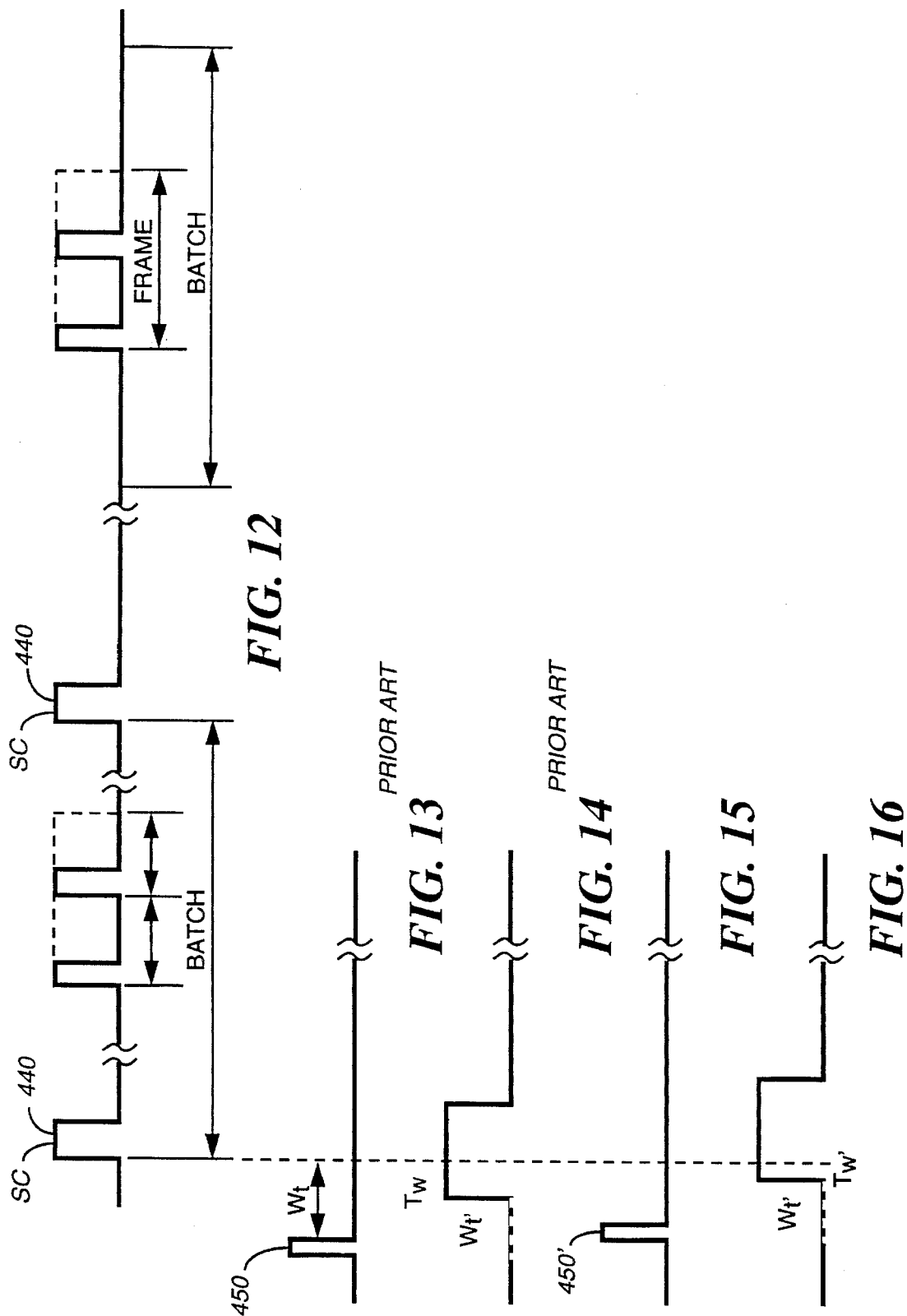

5,530,911

1

METHOD AND APPARATUS FOR BATTERY DRAIN REDUCTION BY ADJUSTING FOR DYNAMIC CHANGES OF RECEIVER WARM-UP TIME

FIELD OF THE INVENTION

This invention relates in general to portable receiver devices and more particularly to reducing the battery drain of a portable receiver device, such as a selective call receiver, by adjusting for the dynamic changes in warm-up time of a component of the receiver.

BACKGROUND OF THE INVENTION

In portable battery-operated products, such as selective call receivers, it is a continuing challenge to reduce the drain of current from the battery which powers the receiver. Many efforts have been made to prolong the useful life of a battery, and these efforts are the subject of various patents. See, for example, U.S. Pat. No. 5,251,325 to Davis et al. and 5,150,361 to Wieczorek et al.

Certain portable receivers utilize synthesized receiver circuitry, which suffer from high current drain when operative. It is therefore imperative that the receiver circuitry, particularly those receiver circuitry components which are the greatest load on the battery, be kept powered down as much as possible.

Many battery saving efforts involve powering up the receiver only at times when the device is designated to receive information. At substantially all other times, the receiver is powered down. For the receiver circuitry to be operative at these designated periods of time, the circuitry must be powered up before the necessary time period to be operable to detect and process information. In current implementations, such as for a portable receiver operating on a signaling protocol such as POCSAG (Post Office Code Standardisation Advisory Group), the receiver circuitry is powered up before the designated time slot by a time period corresponding to the worst case warm-up time. This warm-up time may be as much as 40% longer than what is necessary under the best conditions. Warming up the receiver circuitry too early wastes battery power because the circuitry will be operative longer than needed before the designated time slot.

The actual warm-up time of the receiver circuitry varies with temperature and other parameters. It would therefore be desirable to adjust for the changing warm-up time to use battery power more efficiently.

SUMMARY OF THE INVENTION

Briefly, according to the invention, the current drain of a battery in a portable receiver, such as a selective call receiver, is minimized by monitoring the warm-up time of certain components of the receiver to determine changes. The receiver is powered up prior to designated time slots by a time period according to the dynamic changes in receiver warm-up time.

According to one aspect of the present invention, a system is provided for minimizing battery drain in a portable receiver by compensating for dynamic changes in a warm-up time of a component of the portable receiver comprising circuitry (microcomputer-based) for periodically monitoring the dynamically changing warm-up time of a component of the receiver which is slowest to warm-up, and for initiating warm-up of that component on the basis of the dynamically changing warm-up time, prior to time slots requiring wake-up of the component of the receiver.

In accordance with another aspect of the present invention, a method is provided for dynamically adjusting for the warm-up time of a component in a portable communication receiver device, the method comprising steps of initiating warm-up of the component; monitoring an operating condition of the component to determine when the component is warmed up; and setting an optimal warm-up time to a time duration substantially equal to the elapsed time between initiating warm-up of the component and the instant of time when it is determined the component is warmed up. These steps are repeated periodically to determine a current optimal warm-up time of the component.

BRIEF DESCRIPTION OF THE DRAWINGS

FIGS. 4, 5, 6 and 7 are timing diagrams of various signals of a receiver synthesizer for the purpose of illustrating how warm-up of the oscillator is detected according to the present invention.

FIGS. 12 is a timing diagram illustrating an example of the time slots of a paging protocol signal during which the receiver is powered up.

FIGS. 13 and 14 are timing diagrams illustrating receiver warm-up employing fixed warm-up time according to the prior art.

FIG. 15 and 16 are timing diagrams illustrating receiver warm-up employing dynamic warm-up time compensation and the resulting power savings achieved in accordance with the present invention.

DESCRIPTION OF A PREFERRED EMBODIMENT

Figure 1:
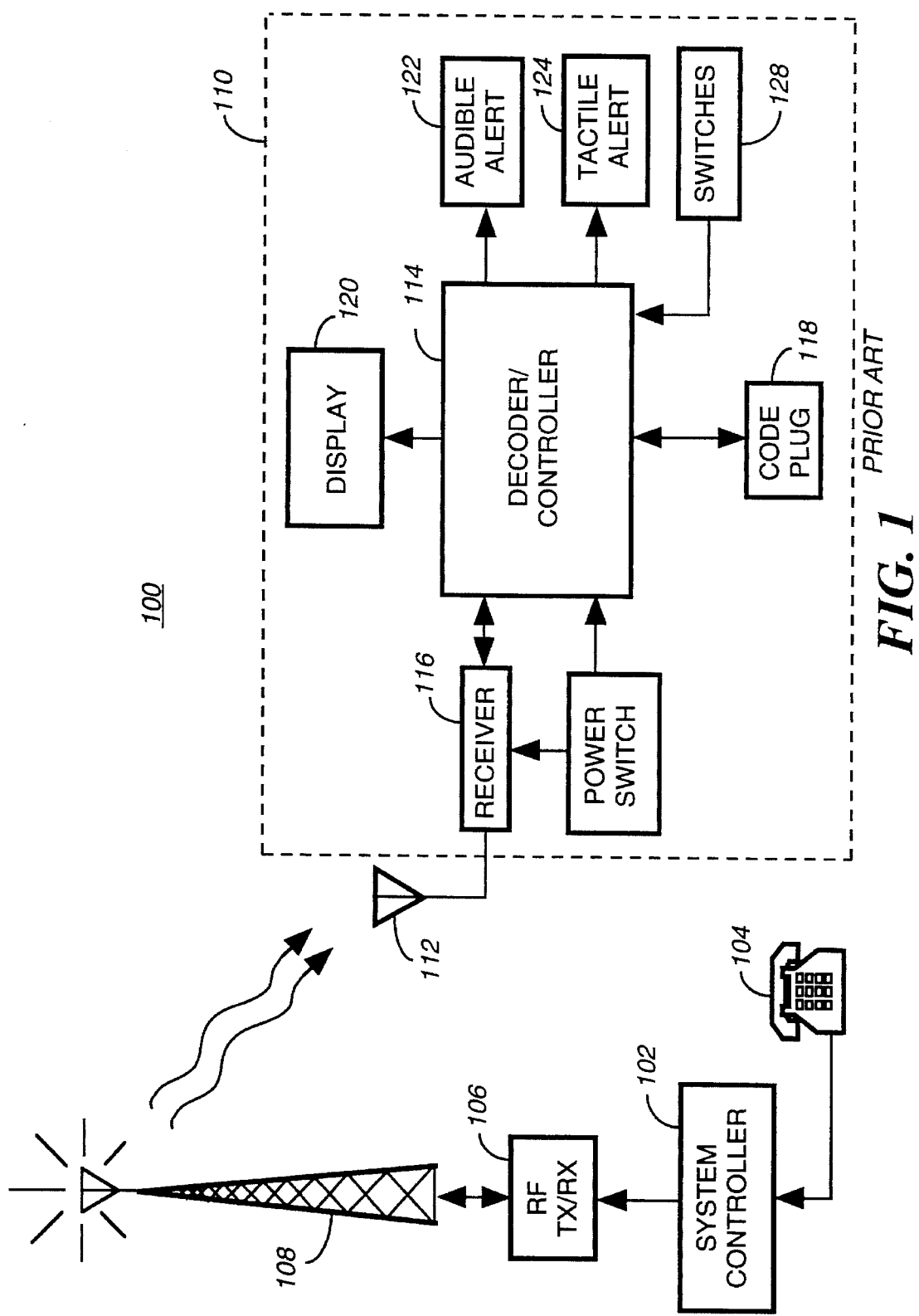
FIG. 1 is an electrical block diagram of a selective call receiver system.

Referring first to FIG. 1, a selective call receiving system is generally shown at 100. The system 100 comprises at a message transmitting end a system controller 102 for receiving paging messages from remote locations represented by the telephone at 104. The system controller generates a signal which includes an address for a particular selective call receiver(s), which is modulated onto a carrier by a radio frequency (RF) transmitter 106 and transmitted by antenna 108. It should be understood that alphanumeric and facsimile messages may also be received by the system controller 102, for transmission to an appropriate selective call receiver(s).

The selective call receiver is shown by block 110 and receives signals via antenna 112. The selective call receiver shown at 110 is well known in the art, and it should be understood that it comprises at its heart a decoder/controller 114. The decoder/controller 114 is responsive to information extracted from the RF signals demodulated by receiver 116. The selective call receiver 110 is assigned a unique address in the code plug 118, and the decoder/controller 114 is responsive to data in the demodulated RF signal which specifies a message for the corresponding address. The message may be displayed on a display 120. In addition, an audible alert or tactile alert may be generated by components 122 and 124, respectively. The mode of operation of the pager is controlled by switches 128.

The general operation of a selective call receiver system shown in FIG. 1 is well known in the art. Furthermore, paging protocols may vary, but there are certain protocols that are the mainstay of the industry. One such protocol is the POCSAG protocol, which is a digital addressing and messaging protocol capable of transmitting in a single batch, address and messaging information for multiple selective call receivers.

In a paging protocol such as POCSAG, extensive battery savings is afforded by designating certain time slots of the batch for certain aspects of the protocol. This is well known in the art. In the protocols known and used today, the portable unit, whether it be a selective call receiver or another device, is programmed to power up and power down periodically at certain time intervals to detect information addressed to it. This saves a great deal on drain of battery power. Some components of the portable unit, such as the receiver, must be powered up for a certain period of time before the component can operate reliably. To account for this warm-up time period, the portable unit is programmed to "waken" and power-up these components before the designated time period begins during which a signal is to be detected. This warm-up time period is often chosen to be longer than the longest warm-up time of any of the components in that portion of the portable unit. For example, in a synthesized receiver of a selective call receiver, the oscillator takes the most amount of time to warm up.

However, the warm-up time of the oscillator varies with, for example, temperature of the portable unit. As a result, the warm-up time of the oscillator may decrease during certain time periods of usage. In accordance with the present invention, the warm-up time is monitored to determine how it dynamically changes, and to periodically adjust for changes therein.

Figure 2:
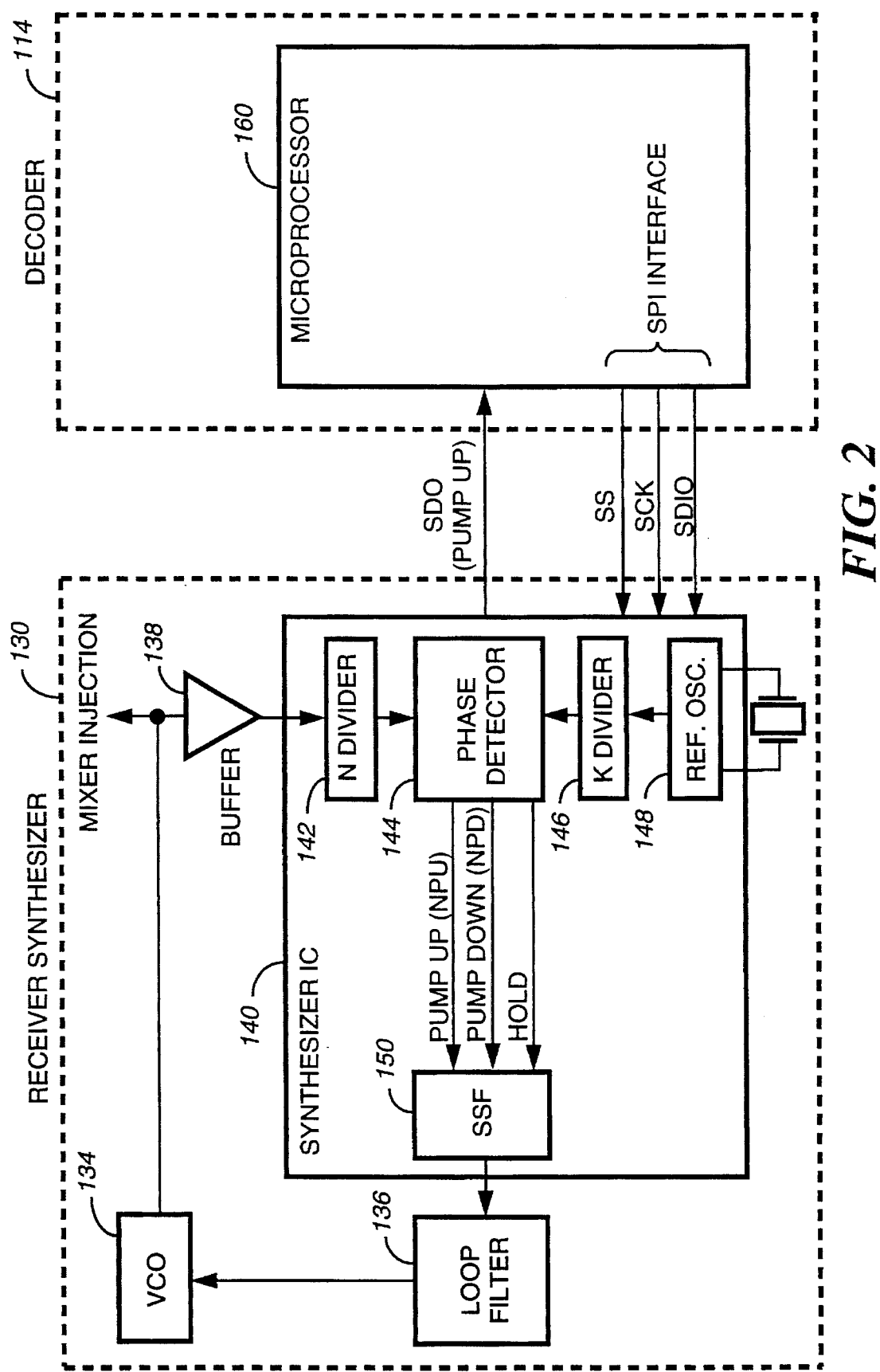
FIG. 2 is an electrical circuit diagram depicting a receiver synthesizer and a decoder in a selective call receiver, and illustrating how the operation of the receiver oscillator is monitored by the decoder in accordance with the present invention.

FIG. 2 illustrates a receiver synthesizer portion 130 of the receiver 116, including a phase-lock-loop (PLL) 132. The PLL comprises a voltage controlled oscillator (VCO) 134, a loop filter 136, a buffer 138 and a synthesizer integrated circuit (IC) 140. The synthesizer IC includes an N-frequency divider 142, a phase detector 144, a K-frequency divider 146, a reference oscillator 148 and a sink/source/float (SSF) circuit 150, which commands the charge pump circuit to sink current, source current or float, and its function in the PLL should be understood by one with ordinary skill in the art. The details of the synthesizer and PLL are not a part of the present invention. However, it will be appreciated by those with ordinary skill in the art that the phase detector generates a charge pump signal, no pump up (NPU), a charge pump signal, no pump down (NPD) and a hold signal. These signals control the oscillation frequency of the oscillator 134.

The receiver synthesizer 130 is controlled by a microprocessor 160 of the decoder/controller 114. The microprocessor 160 is preferably one of a family of Motorola MCHC11 microprocessors, or any other suitable low power microprocessor. The phase lock loop timing is controlled by the serial peripheral interface (SPI). The SPI allows the microprocessor 160 to communicate with peripheral devices, including but not limited to, synthesized receivers, and is a mechanism well known in the art. The microprocessor 160 is capable of accessing signals indicative of the operation of the synthesizer IC 140 by the serial data output (SDO) command. The SDO can port out six different signals from the phase detector 144 (test signals internal to the synthesizer IC 140), including the pump up and pump down signals. The SPI signals SS (slave select), SCK (serial clock) and SDIO (serial data input) are signals well known to those with ordinary skill in the art, and control the operation of the receiver synthesizer 130. As will be explained in conjunction with FIGS. 4–8, the duty cycle of the NPU or NPD signal is measured to determine when the oscillator is settled on the desired frequency, and thus is warmed up to deliver a proper signal for demodulating an incoming carrier signal.

Figure 3:
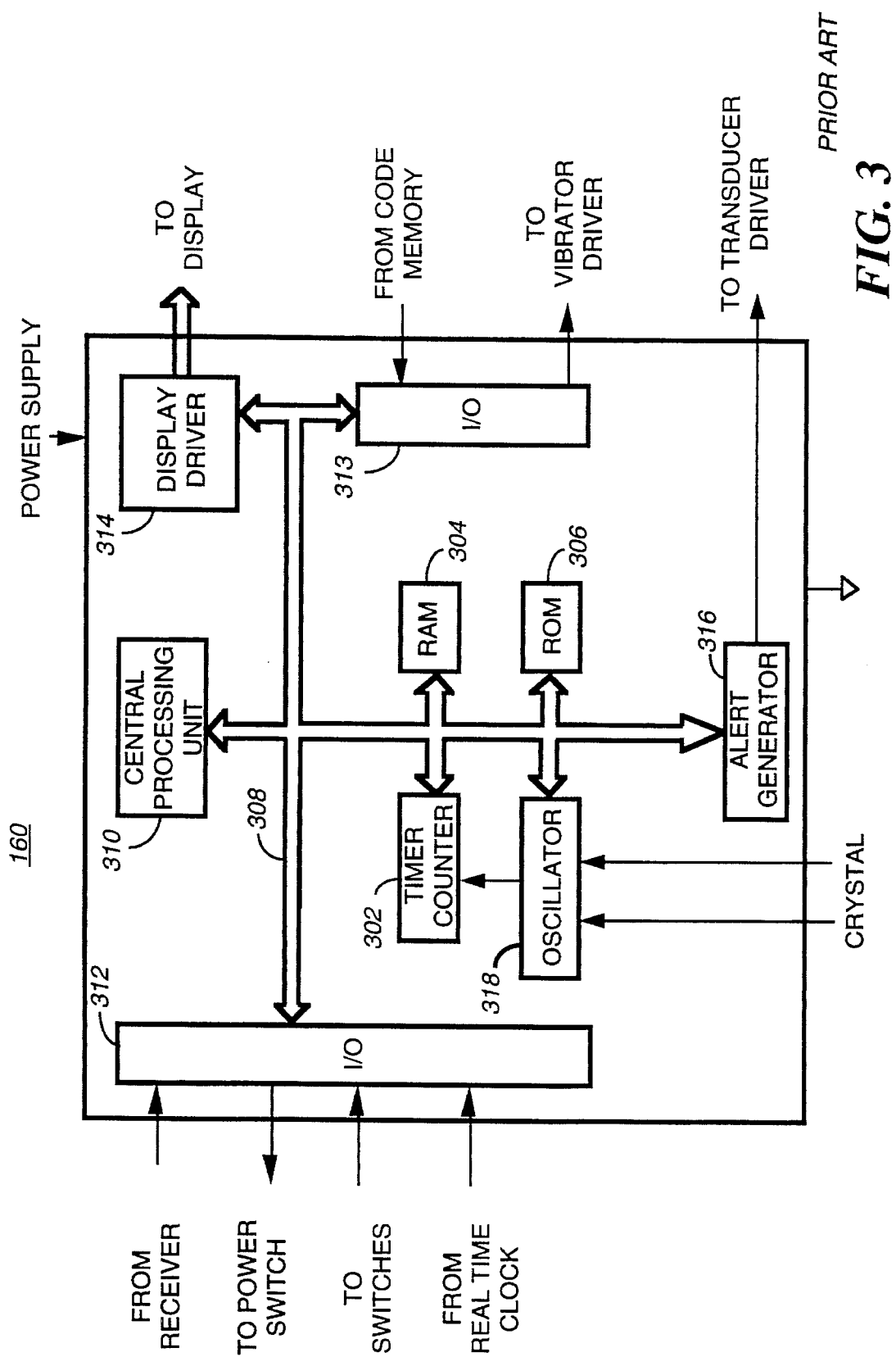
FIG. 3 is an electrical block diagram illustrating the internal components of the microprocessor of the selective call receiver.

Turning now to FIG. 3, the microprocessor 160 is illustrated in greater detail. The microprocessor 160 is well known to those with ordinary skill in the art of selective call receivers. The microprocessor comprises a timer counter 302, a random access memory (RAM) 304, a read only memory (ROM) 306, a bus 308, a central processing unit 310, I/O ports 312 and 313, a display driver 314 and an alert generator 316. To be brief, the central processing unit 310 controls the operation of the selective call receiver on the basis of a control program stored in the ROM 306, and on the basis of the information stored in the code plug 118 (FIG. 1).

FIGS. 4–7 illustrate various signals of the phase lock loop. FIG. 4 illustrates the timing of the reference oscillator 148. FIG. 5 illustrates the timing at the output of the K-divider 146, which is equal to the frequency of the reference oscillator 148, divided by K. FIG. 6 illustrates the timing of the charge pump signal NPU, and FIG. 7 illustrates the timing of the charge pump signal NPD. FIGS. 5–7 show how the noted signals change as the frequency and phase of the VCO 134 is locked to the desired frequency.

Figure 8:
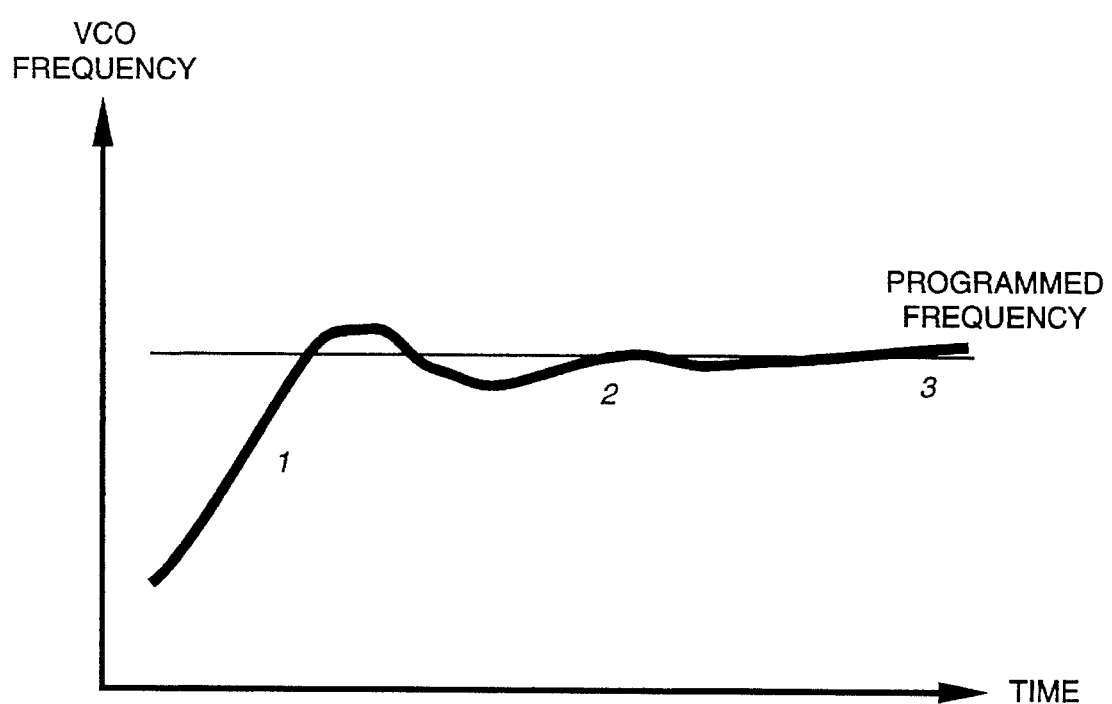
FIG. 8 is a graph illustrating the stages of locking the phase and frequency of the oscillator.

Referring to FIG. 8 in conjunction with FIGS. 4–7, there are basically three modes of the phase lock loop each time the VCO is to be warmed up. In phase 1, called the "frequency lock" mode, the difference between the frequency of the VCO, previously off or at a very low frequency, and the frequency of the reference oscillator, is large. During this mode, either NPU or NPD is ON or low most of the time, in order to drive the VCO 134 to lock onto the desired frequency. NPU and NPD are "active low" signals. Consequently, when NPU is zero, it is commanding the charge pump circuit to pump up. In the second phase, called "phase lock", the frequency of the VCO 134 settles to the desired frequency, and the NPU or NPD signal duty cycle vary. Finally, in the third and final phase, phase and frequency are locked, and there is little activity in NPU or NPD, other than the 20 ns reset intervals that occur once each reference oscillator rising edge. Consequently, it can be determined when the VCO 134 is frequency and phase locked by monitoring the NPU or NPD signals. In accordance with the present invention, the microprocessor 160 is programmed to measure the duty cycle or pulse width of the 20 ns reset (pulses) intervals of NPU or NPD as being indicative of frequency and phase lock of the VCO 134.

The reset pulses occur at each reference clock rising edge and are fixed to the reference clock frequency, which is stable during PLL locking. The pulse width or duty cycle of the NPU and NPD signals are changing during the PLL process, as shown in FIGS. 6 and 7. If all of the edges of the reference clock and VCO signals are aligned, i.e., locked in phase, the only NPU,NPD activity is the reset pulses. When the edges are not lined up, NPU or NPD turn on (by going to zero) during the interval between the rising reference clock edge and rising VCO edge. The microprocessor 160 measures the pulse widths of the NPU/NPD reset pulses by integrating the signal or measuring time between edges of the pulse.

Figure 9:
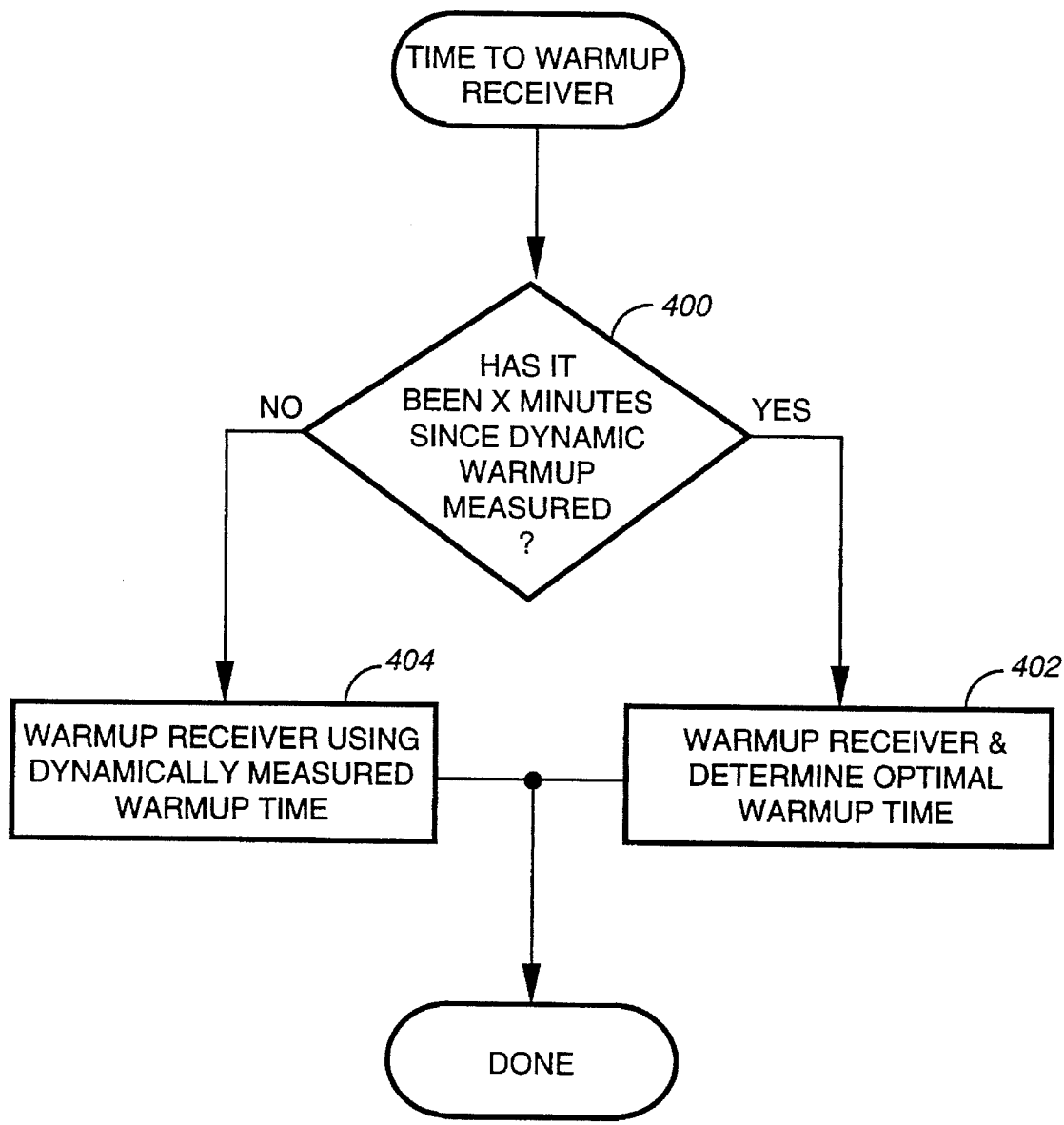
FIG. 9 is a flow chart illustrating the general operation of the warm-up compensation system and method according to the present invention.
Figure 10:
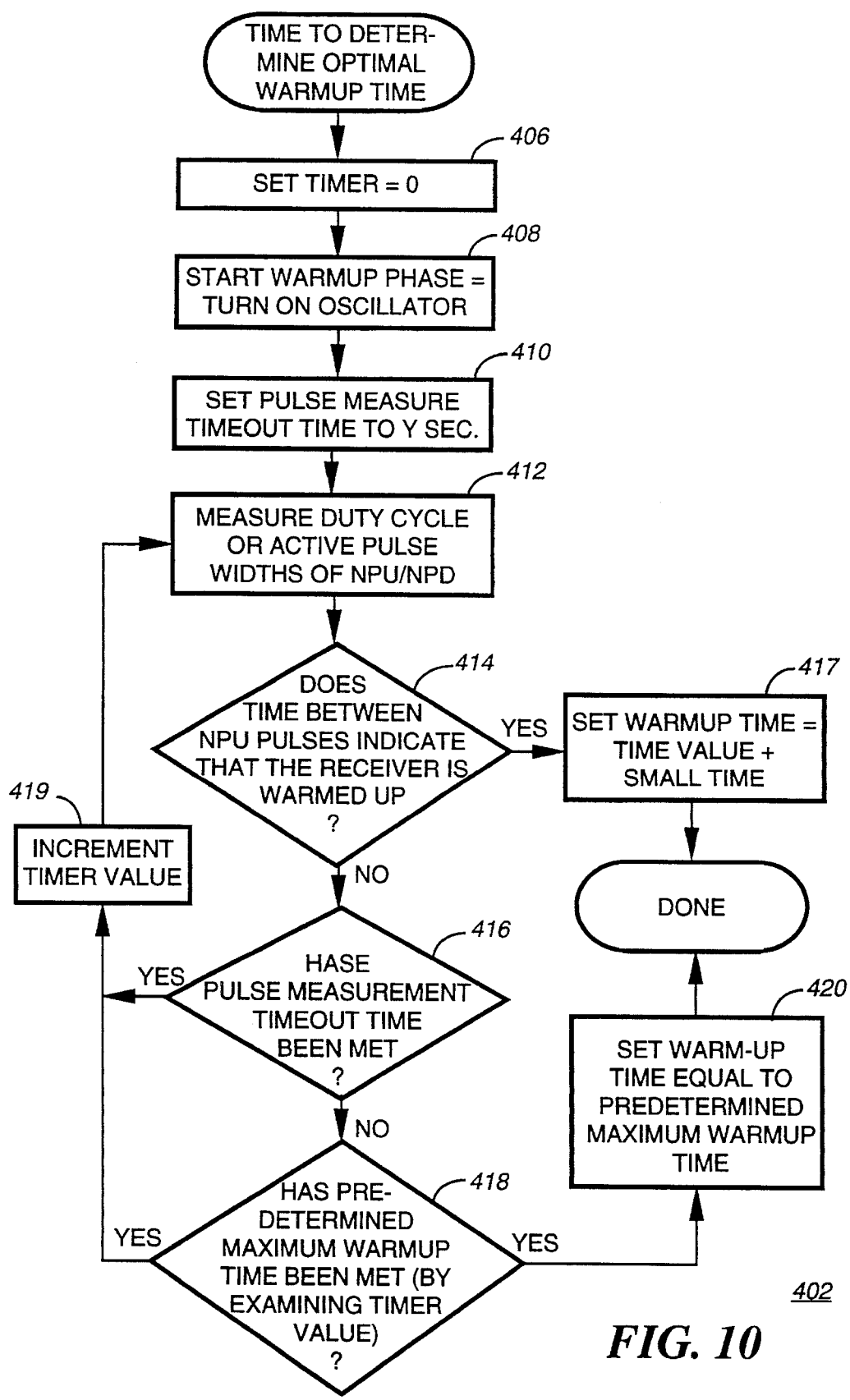
FIG. 10 is a flow chart illustrating the procedure for monitoring the operation of the receiver oscillator to periodically determine the amount of time the oscillator takes to warm up.

FIGS. 9 and 10 illustrate the logic flow of the procedure to monitor and adjust for changes in the warm-up time of the receiver. This procedure is preferably embodied as a program executed by the microprocessor 160 which is stored in ROM 306. However, the procedure may optionally be implemented by other means, such as by analog or digital circuitry.

FIG. 9 shows the general flow of the procedure. The warm-up time of the receiver is preferably measured and adjusted for periodically. For each instant of time that the microprocessor triggers the receiver to warm up, it is necessary to decide what amount of lead time should be allotted for the warm-up time of the receiver. Therefore, in step 400, it is determined whether a predetermined amount of time X has elapsed since the last warm-up determination. The time period X is, for example, 10 minutes but may be adjusted.

If, as the example of FIG. 9 illustrates, a period of X has elapsed since the last dynamic warm-up measurement, then in step 302, the receiver is warmed up using a worst case warm-up time as the maximum warm-up time, and the time duration for receiver warm-up is determined. Otherwise, if at the present instant of time for receiver warm-up it the X-time period since the last measurement has not elapsed, then the receiver is warmed up in step 404 using the most current dynamically measured warm-up time.

The worst case warm-up time is programmed, and is set according to a predetermined maximum warm-up time of the oscillator in the receiver. The worst case warm-up time for the receiver is determined by the longest warm-up time for any receiver component, which typically is the oscillator. For example, a worst case warm-up time of the oscillator may be 13 ms. Moreover, in the receiver, this is the warm-up time which is most dynamic, being very much dependent upon temperature. Other components in the receiver have much faster warm-up times, and therefore are less critical in the warm-up sequence of the receiver than the oscillator.

Referring now to FIG. 10, the procedure for dynamically determining optimal warm-up time will be explained. In step 406, a timer of the microprocessor 160, such as timer 302 (FIG. 3) is set to zero. Next, in step 408, the warm-up phase of the receiver begins, and the oscillator is turned on. For a period of time Y corresponding to a pulse measurement time-out set by steps 410 and 416, the time between rising and falling edges of NPU (or NPD) reset pulses are measured in step 412 to determine pulse width or the signal can be integrated by techniques well known in the art to determine duty cycle. The time period Y is, for example, 100 microseconds, but may vary. In step 414, it is determined whether the time between NPU pulses indicates that the oscillator, and hence the receiver, is warmed up. Specifically, and with reference to FIG. 6 or 7, the microprocessor 160 looks for the occurrence of the shorter (20 ns wide) reset pulses of the NPU signal to determine that the VCO 134 is frequency and phase locked. The wider reset pulses are indicative of charge pump drive, and are not present when the VCO is frequency and phase locked. Thus, in this example, the condition that the reset pulses (also called "active" ON pulses) are no more than 20 ns wide is indicative of frequency and phase lock, and is detected by the microprocessor 160 to declare the VCO 134 is warmed up.

If in step 414, it is determined that the NPU pulses indicate receiver warm-up, then in step 417 the warm-up time is set to the value of the time plus some small "pad" amount of time, to ensure that the warm-up time is not set to be too short. This "pad" amount of time is a fixed and small value, and as an example, is 300 microseconds.

If the pulse measurement time-out has expired, then the timer value is incremented in step 419 and steps 412 and 414 are repeated. If not, in step 418, it is determined whether the timer value reaches the predetermined maximum warm-up time (worst case warm-up time). If the predetermined maximum is reached, then the warm-up time is set to be equal to the predetermined maximum warm-up time in step 420. On the other hand, if step 418 is reached and the predetermined maximum has not been reached, then the timer value is incremented in step 419, and the loop of steps 410–418 continues.

Accordingly, each time the receiver is to be warmed up, warm-up time is adjusted to the value determined at the most recent dynamic warm-up determination procedure (the "current optimal warm-up time"), unless it is time to determine a more up-to-date warm-up time.

Figure 11:
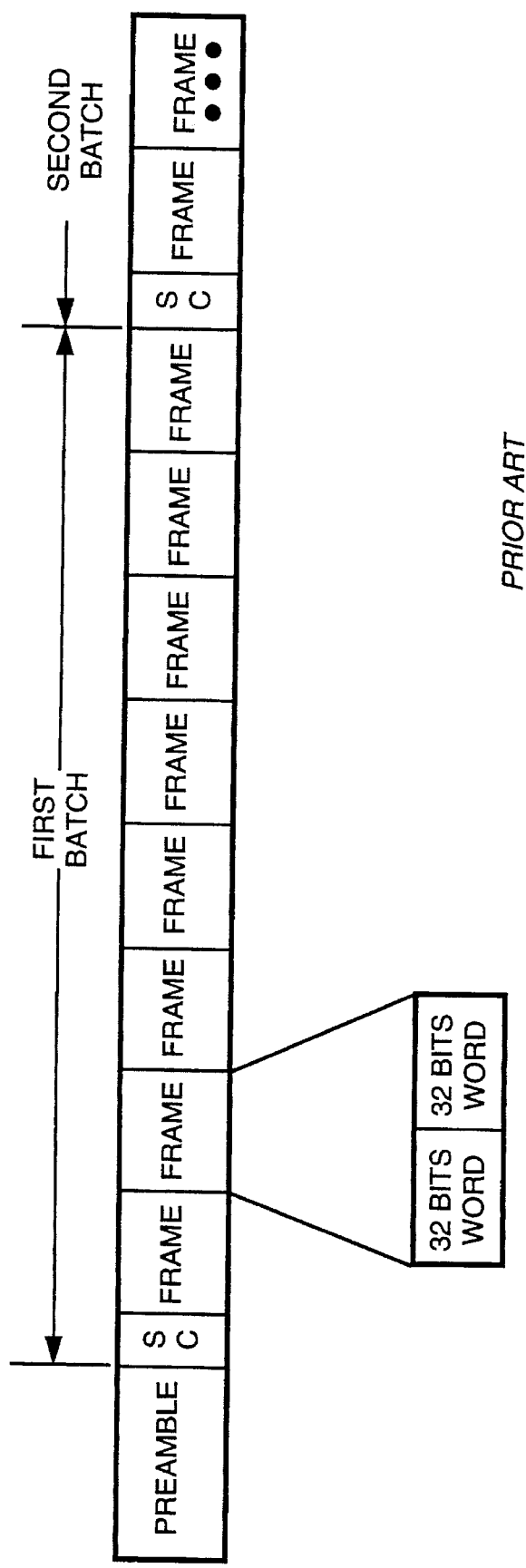
FIG. 11 is a timing diagram of a POCSAG protocol paging signal.

FIG. 11 illustrates a POCSAG data batch, and is used as a reference to highlight the power savings of the present invention. The goal of the present invention is to minimize the amount of time that the receiver is ON when it is not required to be ON. By adjusting for the changing warm-up time of the receiver, the receiver can be powered up so that there is minimal wasted ON time between the instant that warm-up is completed and the time at which reception of a signal is to be made.

FIG. 12 is an example of the time slots that the receiver in the pager should be powered up to receive a signal. FIG. 13 shows the timing of a signal, called receiver turn-on pulse, generated by the microprocessor 160 to power up the receiver for time slot 440 (for sync SC) based on a fixed maximum warm-up time Wt of the receiver. The receiver turn-on pulse 450 is generated before the time slot 440 by a period of time larger than the maximum warm-up time of the receiver.

FIG. 14 shows that the receiver actually takes time Wt' to warm up, which often is less than Wt, and nevertheless varies. Consequently, the receiver may be powered up and ready for reception well before the time slot 440, wasting battery current. That is, the receiver is unnecessarily ON for a time interval Tw.

FIGS. 15 and 16 show that if the changes in the warm-up time of the receiver are monitored, the receiver can be powered up later, so that it is ON for a shorter period of time before the time slot 440. In FIG. 15, turn-on pulse 450' is later in time than 450, and as a result, the receiver is turned ON early by a time duration Tw', which under best conditions is significantly smaller than Tw. Moreover, the receiver can be powered up even later in time when it is determined that oscillator is warms-up particularly fast, so that the time interval Tw' is minimized.

FIGS. 12–16 show an example with reference to a single time slot 440 in a POCSAG signal for which the receiver must be powered up. It should be understood that a receiver in a selective call receiver would power up multiple times during a POCSAG batch, during certain of these times the receiver is asynchronous while during others the receiver is synchronous.

Consider an example of a 1200 baud selective call receiver which is 50% synchronous and 50% asynchronous and has a battery with 2000 hours of life and 4.5 ma receiver current drain. The maximum warm-up time for the oscillator is, for example, 13 ms and the optimal warm-up time is 10 ms. During asynchronous operation, the receiver warms up twice every second for 1000 hours. The present invention saves 3 ms per warm-up, which is 27 ma-hours. During synchronous operation, the receiver warms up three times every ½ second for 1000 hours. The present invention saves 81 ma-hours. In total, the battery life saved is 108 ma-hours, which is approximately 5% of a 1500-ma-hour AA battery.

Further, calculations have shown that by compensating for the dynamic changes in the warm-up time of the receiver powered by a 775 ma-hour AAA battery, 1.55 days of usage are added to a 512 baud selective call receiver; 2.30 days of operation are added to the battery life of a 1200 baud receiver; and 2.65 days are added to the battery life of a 2400 baud receiver.

The battery saving system and method of the present invention is applicable to components of portable devices other than a receiver. The invention may prove useful in adjusting for dynamically changing warm-up times of other components, or portions of other components. In the case of a receiver, it has been found that the oscillator drains a substantial amount of current and also requires the most time to warm up. Therefore, the warm-up time of the oscillator is the controlling factor when adjusting for the warm-up time of the receiver.

In some instances, a selective call receiver has two stages of demodulation/mixing, requiring an oscillator in each. In this case, it should be understood that the present invention is applicable to compensate for the changing warm-up times of multiple components separately, such as the oscillator in each stage, or multiple components collectively.

The above description is intended by way of example only and is not intended to limit the present invention in any way except as set forth in the following claims.

What is claimed is:

1. A method for dynamically adjusting for a warm-up time of a circuit in a portable communication receiver, the method comprising steps of:
   a) initiating warm-up of the circuit by supplying power to the circuit;
   b) monitoring a signal internal to the circuit once power is supplied to the circuit in step (a);
   c) determining that the circuit is warmed up based on the signal internal to the circuit; and
   d) setting an optimal warm-up time to a time duration substantially equal to an elapsed time between initiating warm-up of the circuit and an instant of time when it is determined in step (c) that the circuit is warmed up.

2. The method of claim 1, wherein the step of monitoring comprises the step of monitoring the signal which is indicative of operation of an oscillator in the portable communication receiver.

3. The method of claim 2, wherein the step of monitoring comprises monitoring a charge pump signal in a phase lock loop which includes the oscillator.

4. The method of claim 3, wherein the step of monitoring comprises monitoring the duty cycle of the charge pump signal.

5. The method of claim 4, wherein the step of monitoring comprises the step of measuring the duration of active ON pulses of the charge pump signal.

6. The method of claim 5, wherein the step of monitoring comprises detecting rising and falling edges of the active ON pulses and determining the time elapsed between the edges.

7. The method of claim 5, wherein the step of monitoring comprises integrating the charge pump signal.

8. The method of claim 1, and further comprising the step of setting the optimal warm-up time to a value substantially equal to a predetermined maximum warm-up time of the circuit when it is determined that the elapsed time of step (d) is substantially equal to said predetermined maximum warm-up time.

9. The method of claim 1, wherein the step of initiating warm-up of the circuit is performed a period of time prior to designated receiver activation time slots in accordance with the current optimal warm-up time of the circuit.

10. The method of claim 1, wherein the step of monitoring comprises monitoring the signal internal to the circuit in a selective call receiver.

11. A system for minimizing battery drain in a portable receiver by compensating for dynamic changes in a warm-up time of a circuit of the portable receiver comprising:
    means for periodically monitoring a warm-up time of a circuit of the portable receiver which is slowest to warm-up by monitoring a signal internal to the circuit to determine an optimal warm-up time based on an elapsed time between initiating warm-up of the circuit and an instant of time when it is determined that the circuit is warmed up according to the signal internal to the circuit; and
    means for initiating warm-up of the circuit on the basis of the optimal warm-up time.

12. The system of claim 11, wherein the portable receiver is a selective call receiver.

13. The system of claim 11, wherein said circuit comprises a receiver circuit for receiving a radio frequency signal; and the means for periodically monitoring comprises a control circuit for controlling the operation of the receiver circuit so that the receiver circuit is powered up only at times when a radio frequency signal is expected to be received.

14. The system of claim 13, wherein said control circuit comprises a memory for storing a predetermined maximum warm-up time of the receiver circuit, and said means for initiating powers up the receiver circuit prior to said instant of time by a time period substantially equal to said maximum warm-up time if the optimal warm-up time is substantially equal to said maximum warm-up time.

15. A communication receiver comprising:
    a synthesized receiver circuit and a control circuit for controlling the synthesized receiver circuit, wherein the control circuit monitors a signal internal to the synthesized receiver circuit for determining when a component of the receiver circuit is warmed up based on the signal internal to the synthesized receiver circuit and setting an optimal warm-up time to a time duration substantially equal to an elapsed time between initiating warm-up of the receiver circuit and an instant of time when it is determined that the circuit is warmed up, the control circuit powering up the synthesizer receiver circuit based on the optimal warm-up time of the synthesized receiver circuit.

16. The method of claim 1, wherein the step of monitoring comprises monitoring a signal internal to a receiver synthesizer which comprises a voltage controlled oscillator, and which signal is indicative of the operation of the voltage controlled oscillator.

17. The method of claim 16, wherein the step of monitoring the signal internal to a receiver synthesizer comprises monitoring a charge pump signal which drives the voltage controlled oscillator.

18. The method of claim 17, wherein the step of monitoring comprises measuring widths of pulses of the charge pump signal, and the step of determining comprises determining that the voltage controlled oscillator is warmed up when the widths of pulses of the charge pump signal are no greater than a predetermined pulse width.

19. The method of claim 1, and further comprising the step (e) of periodically repeating steps (a)–(d) at designated power-up occurrences of the portable communication receiver to determine a current optimal warm-up time of the circuit.

20. The communication receiver of claim 15, wherein the component of the synthesized receiver circuit comprises an oscillator and wherein the control circuit monitors said signal which is indicative of the operation of the voltage controlled oscillator.

21. The communication receiver of claim 20, wherein the control circuit monitors a charge pump signal which drives the voltage controlled oscillator.

22. A selective call receiver device comprising the communication receiver of claim 15.

* * * * *